(12) United States Patent
Gencer et al.

(10) Patent No.: US 10,342,189 B2
(45) Date of Patent: Jul. 9, 2019

(54) AEROBIC, BIOREMEDIATION TREATMENT SYSTEM COMPRISING FLOATING INERT MEDIA IN AN AQUEOUS ENVIRONMENT

(71) Applicant: BUBBLECLEAR, Cleveland, OH (US)

(72) Inventors: Mehmet A. Gencer, Brecksville, OH (US); Kaan E. Gencer, Brecksville, OH (US); Paul M. Zakriski, Broadview Heights, OH (US); Clark B. Langmack, Gates Mills, OH (US); Jay L. Schabel, Chagrin Falls, OH (US)

(73) Assignee: BUBBLECLEAR, Cleveland, OH (US)

( * ) Notice: Subject to any disclaimer, the term of this patent is extended or adjusted under 35 U.S.C. 154(b) by 45 days.

(21) Appl. No.: 15/472,854

(22) Filed: Mar. 29, 2017

(65) Prior Publication Data

US 2017/0332567 A1 Nov. 23, 2017

Related U.S. Application Data

(60) Provisional application No. 62/337,453, filed on May 17, 2016.

(51) Int. Cl.
*C02F 3/00* (2006.01)
*C02F 3/10* (2006.01)
(Continued)

(52) U.S. Cl.
CPC .............. *A01G 31/00* (2013.01); *A01G 33/00* (2013.01); *A01H 4/001* (2013.01); *A01K 1/01* (2013.01);
(Continued)

(58) Field of Classification Search
CPC ... C02F 3/10; C02F 3/02; C02F 3/101; A01G 24/00; A01K 61/60; A01K 61/70; A01K 63/04
(Continued)

(56) References Cited

U.S. PATENT DOCUMENTS 4,859,594 A 8/1989 Portier
4,882,066 A 11/1989 Portier
(Continued)

FOREIGN PATENT DOCUMENTS

GB 1461577 1/1977
GB 2080687 2/1982
(Continued)

OTHER PUBLICATIONS

PCT International Search Report and Written Opinion, dated Aug. 4, 2017.

*Primary Examiner* — Claire A Norris
(74) *Attorney, Agent, or Firm* — Hudak, Shunk & Farine Co. LPA

(57) ABSTRACT

An aerobic treatment system includes a plurality of highly porous, high surface area, inert, synthetic, inorganic, or natural material particles, having a specific gravity of less than 1.0 that float on an enclosed aqueous environment whereby plants and/or microbes can be grown thereon and/or animals such as fish can be raised therein. The inert particles trap air bubbles and nutrients for the growth of diverse types of plants, animals, or microbial systems, which enable phyto treatment of an aqueous waterbody with the ability to limit the growth of unwanted plant and algae such as blue-green algae. The above aerobic bio treatment system contains desirably bioremediation media having one or more microorganisms that are able to withstand system shocks while minimizing energy usage associated with aeration. The system can generally be utilized in any aqueous environment such as waste water and/or polluted water in an enclosed area such as a container, tank, pond, lake, or the like.

26 Claims, 8 Drawing Sheets

(51) Int. Cl.
*C02F 3/32* (2006.01)
*C02F 3/34* (2006.01)
*A01G 31/00* (2018.01)
*A01H 4/00* (2006.01)
*A01K 1/01* (2006.01)
*A01G 33/00* (2006.01)
*A01K 31/04* (2006.01)
*A01K 61/10* (2017.01)
*A01K 63/00* (2017.01)
*A01K 63/04* (2006.01)
*C02F 101/32* (2006.01)
*C02F 103/20* (2006.01)
*C02F 103/32* (2006.01)

(52) U.S. Cl.
CPC ............ *A01K 31/04* (2013.01); *A01K 61/10* (2017.01); *A01K 63/006* (2013.01); *A01K 63/04* (2013.01); *A01K 63/042* (2013.01); *C02F 3/104* (2013.01); *C02F 3/105* (2013.01); *C02F 3/106* (2013.01); *C02F 3/107* (2013.01); *C02F 3/327* (2013.01); *C02F 3/34* (2013.01); *C02F 2003/001* (2013.01); *C02F 2101/32* (2013.01); *C02F 2103/20* (2013.01); *C02F 2103/32* (2013.01); *C02F 2303/04* (2013.01); *Y02A 40/88* (2018.01); *Y02P 60/642* (2015.11); *Y02W 10/15* (2015.05); *Y02W 10/18* (2015.05); *Y02W 10/37* (2015.05)

(58) Field of Classification Search
USPC .. 210/170.05, 242.2, 170.09, 615, 617, 620, 210/242.1, 170.02; 119/221
See application file for complete search history.

(56) References Cited

U.S. PATENT DOCUMENTS

| | | | |
|---|---|---|---|
| 4,971,796 A | 11/1990 | Sjogren | |
| 5,021,088 A | 6/1991 | Portier | |
| 5,240,598 A | 8/1993 | Portier et al. | |
| 5,421,999 A * | 6/1995 | Poole | C02F 3/06 210/150 |
| 5,534,143 A | 7/1996 | Portier et al. | |
| 6,156,204 A | 12/2000 | Todd et al. | |
| 6,558,548 B2 * | 5/2003 | Svirklys | B01D 53/02 210/603 |
| 6,878,279 B2 | 4/2005 | Davis et al. | |
| 7,132,050 B2 | 11/2006 | Davis et al. | |
| 7,314,562 B2 * | 1/2008 | Svirklys | C02F 3/327 210/170.05 |
| 8,372,285 B2 | 2/2013 | Gencer et al. | |
| 9,162,909 B2 | 10/2015 | Gencer et al. | |
| 2002/0073928 A1 | 6/2002 | Ingman et al. | |
| 2009/0139927 A1 * | 6/2009 | Kania | A01G 31/00 210/602 |

FOREIGN PATENT DOCUMENTS

| | | |
|---|---|---|
| WO | 9708302 | 3/1997 |
| WO | 9964359 | 12/1999 |

* cited by examiner

AEROBIC, BIOREMEDIATION TREATMENT SYSTEM COMPRISING FLOATING INERT MEDIA IN AN AQUEOUS ENVIRONMENT

FIELD OF THE INVENTION

The present invention relates to an aerobic biosystem, e.g. hydroponics, having multiple uses including growing various plants, biological matter such as fungi, algae, and microorganisms, on a floatable mass of microporous inert media in an enclosed aqueous environment containing nutrients. The system can generally be utilized in any water body having an enclosed area such as a tank, container, treatment plant, pond, lake, or confined surface area on any body of water, including a stream or river if the media is contained.

An alternate embodiment relates to an aerobic bioremediation system containing a floating mass of the inert media on an enclosed waste water and/or polluted water environment wherein bioremediation matter contained on and within the inert media treats the water.

Another alternate embodiment relates to an aerobic biosystem for aquatic life, e.g. aquaponics, such as marine life, contained on a confined or enclosed body of water having fish nutrients therein as well as a floating mass of the inert media, and also can grow various plants, etc., on the inert media whereby the plants consume the fecal matter excreted by the aquatic life.

Hydroponics relate to growing plants in a nutrient solution generally utilizing an inert medium to provide mechanical support for multiple types of known hydroponic growing systems that include drip, NFT (Nutrient Film Technique), float systems that utilize styrofoam boards or blocks, ebb and flow, aquaponics, aeroponics, and passive hydroponics. These are standard systems that supply nutrients to the roots of a plant via known methods. However, none of them utilize a combination of any of low specific gravity inert media particles, high surface area, highly porous, micropores, or small particles that float on water such as in the form of a bed or layer and have plants that grow thereon. Nor do any of these methods relate to bioremediation aspects of waste or polluted water wherein different types of microorganisms exist on and within the pore of the inert media to eradicate, attack, react, complex or otherwise transform the waste compositions such as biological waste, and non-biological waste compositions, e.g. uptake and retain non-biological waste components, (e.g., chemicals, toxins, etc.) into odorless, detoxified, non-harmful, or desired end products Since the above-noted aerobic, e.g. hydroponic, growing methods, bioremediation of waste or polluted water, or aquaponics, e.g. raising aquatic life, did not contain floatable, inert media, but rather media that would sink in the water, they were not available with respect to aerobic processes. Nor did they create a unique biological environment at the surface of the water that enables multiple applications defined herein.

BACKGROUND OF THE INVENTION

U.S. Pat. No. 4,859,594 issued Aug. 22, 1989 relates to microorganisms separated from natural environments and purified and genetically modified, a process for immobilizing these microorganisms by affixing them to substrates, biocatalytic compositions formed by these microorganisms affixed to substrates, and the use of the biocatalytic compositions for the detoxification of toxin-polluted streams. The microorganisms are (1) *Pseudomonas fluorescens* (ATCC SD 904); (2) *Pseudomonas fluorescense* (ATCC SD 903); (3) *Pseudomonas cepacia* (ATCC SD 905); (4) *Methylobacterrhodinum* (ATCC 113-X); and (5) *Methylobacter* species (ATCC 16 138-X).

U.S. Pat. No. 4,882,066 issued Nov. 21, 1989 relates to compositions characterized as porous solids on the surfaces of which thin films of chitinous material are dispersed, and to a process employing chitin per se, and chitin coated compositions, supra, as contact masses for the removal of metals contaminants, or halogenated organic compounds, from liquid streams contaminated or polluted with these materials.

U.S. Pat. No. 5,021,088 issued Jun. 4, 1991 relates to a process for the separation and recovery from an ore of a metal, or metals, particularly strategic and precious metals, notably gold. A carbon-containing, gold-bearing ore, notably a carbonaceous or carbonaceous pyritic ore, is contacted and microbially pretreated and leached with a heterotrophic microorganism, or admixture of microorganisms, at heterotrophic conditions to cultivate and grow said microorganism, or microorganisms, and reduce the carbon content of the ore by consumption of the carbon. The ore, as a result of the heterotrophic pretreatment is subsequently and allegedly more advantageously colonized by an autotrophic microorganism, or microorganisms, at autotrophic conditions, or hydrometallurgically treated, or both, to facilitate, enhance and increase the amount of gold recovered vis-a-vis a process wherein the gold is recovered (1) by hydrometallurgical processing alone at otherwise similar conditions, or (2), in treating a pyritic ore, by the combination of the autotrophic/hydrometallurgical processing, at otherwise similar conditions.

U.S. Pat. No. 5,240,598 issued Aug. 31, 1993, relates to a microbubble generator disclosed for optimizing the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. In particular, they relate to the continuous mineralization and biodegradation of toxic organic compounds, including volatile organic compounds, associated with industrial and municipal effluents, emissions, and ground water and other aqueous discharges. An embodiment of the invention includes a microbubble chamber packed with small inert particles through which a liquid effluent and oxygen or another gas are admitted under pressure, followed by a venturi chamber to further reduce the size of bubbles.

U.S. Pat. No. 5,534,143 issued Jul. 9, 1996 relates to a microbubble generator disclosed for adjusting the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. They are used in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

U.S. Pat. No. 6,878,279 issued Apr. 12, 2015 relates to a method and apparatus for the continuous microbial remediation of organic wastes in sewers and other waste-laden environments utilizing in-situ microbial seeding. A bioreactor containing inoculated carrier media is suspended within a sewer wet-well or other similar environment, and is at least partially immersed in the waste-laden fluid to be treated. Air and nutrients are continuously supplied to the bio-reactor via conduit from a remote, easily accessible location.

U.S. Pat. No. 7,132,050 issued Nov. 7, 2006 relates to a method and apparatus provided for the continuous microbial remediation of organic wastes in sewers and other waste-laden environments utilizing in-situ microbial seeding. A bio-reactor containing inoculated carrier media is suspended within a sewer wet-well or other similar environment, and is at least partially immersed in the waste-laden fluid to be treated. Air and nutrients are continuously supplied to the bio-reactor via conduit from a remote, easily accessible location.

U.S. Pat. No. 8,372,285, issued Feb. 12, 2013 relates to numerous different types of waste compositions generally in an aqueous environment that are bioremediated under aerobic conditions utilizing highly diverse and multiple microorganisms within a reactor. The process is carried out with the microorganisms attached or bound by a variety of different surface characteristics to packing substrates, located within the reactor, having high surface areas and high porosity in the form of small micropores. Multiple different types of substrates are utilized that include minerals, carbon compounds, polymers and plastics, ceramics, metals, and the like and shapes thereof are utilized that efficiently dissolve air into the water. The reactors have multiple bioremediation stages therein. The reactor also contains at least one perforated chimney through which air can flow and optimize dissolving oxygen into the aqueous environment of the various bioremediation stages. The reactors house maximum biodiversity to bioremediate waste compositions in various wastewaters encountered from industrial, commercial, municipal and residential sources.

U.S. Pat. No. 9,162,909, issued Oct. 20, 2015 relates to numerous different types of waste compositions generally in an aqueous environment that are bio-remediated under aerobic conditions utilizing highly diverse and multiple microorganisms within a reactor. The process is carried out with the microorganisms attached or bound by a variety of different surface characteristics to packing substrates, located within the reactor, having high surface areas and high porosity in the form of small micropores. Multiple different types of substrates are generally utilized that efficiently dissolve air into the water, as well as to maximize the concentration and diversity of types of microorganisms. Reactors are utilized that desirably have tubes therein containing the multiple types of packings and microorganisms and contain at least one perforated chimney through which air can flow and optimize dissolving oxygen into the aqueous environment of the various bioremediation stages.

SUMMARY OF THE INVENTION

The present invention relates to the aerobic treatment of an enclosed or confined aqueous environment. It also relates to a system for the bioremediation treatment of waste and/or polluted water. Another aspect relates to a system for growing various plants (e.g. hydroponics) including fungi, spores, as well as pharmaceutical plants useful as medications for human beings. Yet another aspect of the present invention relates to a system for growing and maintaining aquatic life (e.g. aquaponics) in an aqueous environment and optionally in combination with growing of various plants. Such a system can utilize the fecal and other waste matter derived from an aquatic animal such as fish, and the like, as fertilizer for the plants. All of the above systems utilize a floating bed of inert media on a confined aqueous environment, meaning a tank, pond, aquarium, etc., or a created confinement such as an island, enclosed area, etc., created within a body of water including a stream or river. The inert media desirably has a specific gravity less than 1, high surface area, has micropores therein, is of a small particle size and is highly porous. The media readily floats on the aqueous environment and generally has from 1 to several or numerous layers such that some of the media of the bottom layers will be fully submerged in water, whereas the top layers of the media will be totally out of the water with intermediate layers partially submerged within the water.

One embodiment of the invention is an aqueous system, comprising a floating mass comprising a plurality of inert media particles on an enclosed aqueous environment; said inert media particles, independently, having a surface area of from about 100 to about 100,000 square feet per cubic foot; said inert media particles being capable of growing plants thereon and having a specific gravity, independently, of less than 1.0.

Another embodiment of the invention is an aqueous aerobic bioremediation system, comprising a plurality of inert media particles on an enclosed waste water environment, or an enclosed polluted water environment, or an enclosed non-biological aqueous waste environment, or any combination thereof; wherein said inert media particles contain one or more bioremediation microorganisms; and wherein said inert media particles, independently, have a specific gravity of less than 1.0.

A further embodiment of the invention is an aquaponic system, comprising a floating mass comprising a plurality of inert media particles on an enclosed aqueous environment; said inert media particles, independently, having a surface area of from about 100 to about 100,000 square feet per cubic foot; said inert media particles being capable of growing plants thereon and having a specific gravity, independently, of less than 1.0; said aqueous environment containing at least one nutrient; and said enclosed aqueous environment containing marine life and marine life fecal matter that is capable of being consumed by said plants.

BRIEF DESCRIPTION OF THE DRAWINGS

FIG. 3 is a perspective view of a pond having separate, confined areas (islands) of a floating mass of inert media particles wherein each confined area, independently, can contain different plants that grow therein, or various microorganisms in the media for the bioremediation of the lake such as waste water, polluted water, or the like;

DETAILED DESCRIPTION OF THE INVENTION

Figure 1:
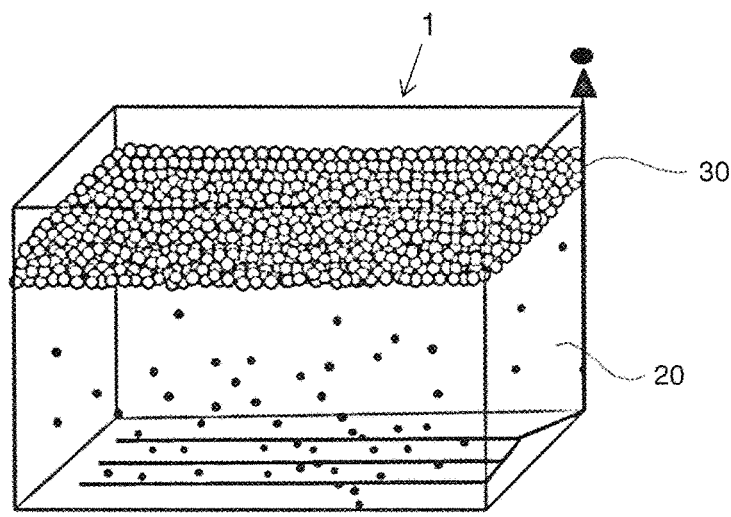
FIG. 1 is a perspective view of a container having a floating mass of inert media on water wherein the individual media are contiguous with each other.

The present invention relates to the use of lightweight (less than 1 specific gravity), high surface area per unit volume of media, small pore size, small particle size, and generally highly porous, inert media that are capable of floating upon an aqueous system, such as water that contains nutrients and/or other matter thereon and/or therein. An important aspect of the present invention is that, unlike other hydroponic systems, the inert media floats upon the aqueous environment and that numerous inert media particles are utilized that tend to agglomerate. By the term "float", it is meant that the inert media has an environment (e.g. water) below or beneath it and that it does not rest on the bottom of a lake, pond, enclosure, or the like. In other words, the media or a bed thereof is free of any support, substrate, or other supporting device. In an aqueous environment, some netting or other form of confinement is employed to retain or enclose the individual medium together so as to form a bed of media to extend partially or entirely across the aqueous environment surface. A bed of the media particles relates to a plurality of particles that are closely confined together and usually and preferably are contiguous or contact one another and also reside on top of one another. The aqueous environment is, a body of water such as in an enclosed system or confined area such as a container, an enclosure, a tank, a pond, a lake, a slow moving stream or river, or the like. The term "partially extend" means that the agglomerated inert media particles can cover anywhere from about 10% or increments of about 10%, up to about 90% of the total enclosed or confined surface area. The inert media particles can exist as a single layer of about one particle deep, or in multiple layers, such as from about 2 to about 8 or about 10 or even about 20 or about 30 layers, or about 50 layers or more deep wherein the bottom layers and particles therein will be totally submerged in the aqueous media. That is, depending upon the specific gravity of the inert particles, the number of layers submerged can be anywhere from about 5% or 10% up to about 98% of the total number of layers. In an open body of water where there is turbulence, or motion, or waves, etc., the inert media particles tend to exist in a dispersed manner. Thus, the phrase "inert media particles on an enclosed aqueous environment" is meant to mean that the floating mass of said inert media particles will contain or enclose at least one or more layers that float on the surface of the enclosed aqueous environment, as also the embodiment of one or more layers that can be partially or totally submerged in the enclosed aqueous environment due to the weight of the above inert particles thereon. In other words, the floating mass of the inert media particles encompasses particles as well as layers thereof that float on the surface of the aqueous environment as well as particles or one or more layers that are contiguously submerged below said floating particles or layers.

Turbulence can also result in what is called a "boiling effect". The boiling effect occurs when the inert media sinks below the surface of the water line and then pops back up to the surface or near the surface when it is agitated, most commonly caused by aeration. The boiling effect enables "polishing" or the removal of small particles in the water to make it clear. Additionally, it allows for all surfaces of the biomedia to continuously stay in contact with both water as well as the dissolved oxygen in the water. The various aqueous environments can also comprise a series of connected tanks, ponds, lakes, and the like wherein optionally seeding, growing, and harvesting operations or processes can occur. In any event, various biological matters such as plants can form about the media, and the roots thereof generally do not penetrate into the media micropores.

It is an important aspect that the aqueous, aerobic biosystem of the present invention contains inert media particles having properties that are amenable to growing plants thereon and/or have good bioremediation properties for waste water, and/or can grow plants including aquatic plants and/or plants to feed aquatic animals such as fish or non-aquatic animals such as chickens, turkeys, pigs, cows, cattle, horses, sheep, etc.

One such important criteria of the present invention, as noted, is that the inert media particles float in water. That is, they are lightweight and have a specific gravity that is less than 1 such as from about 0.4 to about 0.95, desirably from about 0.65 to about 0.85, and preferably from about 0.7 to about 0.8 based upon pure water specific gravity equaling 1.0. Such specific gravity ranges support plants that grow on the inert media, especially when a plurality of such inert media layers exists.

The numerous inert media particles of the present invention importantly have high surface area per unit volume meaning that the surface area thereof, independently, can range from about 100 to about 100,000 and desirably from about 4,000 to about 20,000 square feet per cubic foot. High surface area is an important aspect of the present invention in that the same provides a significant increase with respect to the inert media to grow and sustain microorganisms such as for waste water treatment. It also aids hydroponics in providing suitable sites for nutrients.

Suitable porosity in an inert, homogeneous media set forth herein below, is desirable inasmuch as it traps air bubbles and thus provides a source of oxygen for plants, biological matter, and microorganisms. The same also results in less water evaporation. Yet another advantage is that it provides increased stability to a floating mass with regard to plants so that they generally can be maintained in a vertical orientation. Still another advantage is that a greater number of microbes per a given volume is obtained.

The porosity of the inert media particles, independently, is generally from about 10% to about 50%, desirably from about 20% to about 40%, and preferably from about 25% to about 35%% of the total volume of the inert media particle.

Small porous particles are favored because of their (1) ability to capture air bubbles to provide constant dissolved oxygen demand to microorganisms and flora roots (2) smaller porous media means more surface area per volume so that (a) more microbes can be grown in given volume and (b) an increased ability to capture nutrients, (3) smaller porous particle size increases the stability of the floating mass, and 4) smaller porous particles provide stronger support for root systems below water. The volume (size) of the small porous particles of the present invention, independently, is generally from about 0.0001 to about 0.5, desirably from about 0.007 to about 0.25 and preferably from about 0.05 to about 0.15 cubic inches, including the pores thereof.

Another important aspect of the present invention is that the pores of the inert particles are substantially open micropores that permit microbes to freely travel into and out of the pores. Also, more pores can exist in a given particle volume. That is, of the various pores in the inert media particles, an average of generally at least about 50%, desirably at least about 70%, preferably at least about 90%, and very preferably about all of the pores are open, that is they extend through the inert media particle. Therefore, a close nesting of pores and a small pore size will positively contribute to a larger surface area per unit of particle volume. Since the physical size of the microbe will inhibit its travel in and out from pores that are too small, the lower limit for pore size is approximately an average of about a 5-micron diameter. The pore size diameter of the inert media particles, independently, is generally from about 5 to about 2,000, desirably from about 10 to about 50 microns, with from about 15 to about 30 microns being preferred. Such diameters enable the bio-diverse growth of micro-organisms.

The above-noted aspects of the inert media have been found to result in significantly higher microbial growth, promote increased amounts of dissolved oxygen, the ability to grow plants on the floating, inert media without the need of a support or substrate, and the ability to trap nutrients thereby reducing loading requirements.

By the term inert, it is meant that the media of the present invention does not enter into chemical reactions such as oxidation, reduction, ionization, combustion, polymerization, hydrolysis, condensation, enolization, saponification, nor rearrangement reactions or mechanisms. That is, the inert particles have no or low cation exchange capacity that guarantees complete control over nutrients available to the plant. The same helps maintain a uniform pH, salt concentration through the root profile, and to prevent root decomposition. Any reactions, if they do occur, are slight or very minor, and preferably nil, that is no reaction at all. Another advantage of the inert media is that they have structural integrity and last for years and thus reduce waste. They can also be readily sterilized.

The aqueous, aerobic environment system of the present invention is aerated in accordance with any conventional manner as by pumping, air or oxygen as through a tube, pipe, conduit, etc., into the pond, lake, enclosed area, etc., preferably below the bed of the floatable, inert media. As discussed in more detail hereinafter, the media will store some of the dissolved oxygen in the pores thereof. Accordingly, the amount of air pumped into the aqueous environment will generally be smaller than that normally required with other bioremediation systems.

The lightweight, high surface area, etc., inert media of the present invention include numerous different types of materials. For example, suitable, one or more substrates or porous floating media include synthetic, inorganic, natural and altered via physical and or chemical treatment inorganic/natural particles, such as minerals, carbon substrates, ceramic, metal substrates, polymers, and the like. Examples of various minerals include clay, diatomaceous earth, fuller's earth, titanium dioxide, zirconium dioxide, chromium oxide, zinc oxide, magnesia, boria, boron nitride, pumice, lava, including crushed lava, celite, slag, and the like. Examples of carbon substrates include charcoal, coal, pyrolized wood or wood chips, activated carbon and the like. Ceramics are generally silicates, alumina, mullite, and include brick, tile, terra cotta, porcelain, glasses of all types such as sodium glass and boron glass, porcelain enamels, refractories such as alumina, silicone carbide, boron carbide, and the like. Metal substrates include iron, nickel, cobalt, zinc, aluminum, and the like.

Polymers constitute another class of porous substrates and are generally preferred. They include homopolymers, copolymers, graph copolymers, and the like such as one or more polystyrene or copolymers of styrene and/or α-methyl styrene and acrylonitrile, and copolymers of styrene/acrylonitrile (SAN), terpolymers of styrene, acrylonitrile and diene rubber (ABS), copolymers of styrene/acrylonitrile modified with acrylate elastomers (ASA), copolymers of styrene/acrylonitrile modified with ethylene/propylene/diene monomer (EPDM) rubber (ASE), and copolymers of styrene and maleic anhydride (SMA); polyolefins such as polyethylene and polypropylene; polyvinyl chloride (PVC) and chlorinated polyvinyl chlorides (CPVC); polycarbonates (PC); thermoplastic polyesters (TPES) including polybutylene terephthalate (PBT), polyethylene terephthalate (PET), and aromatic polyesters; polyether-ester segmented copolymers, such as Hytrel* by DuPont Corp.; polyurethanes (PUR); miscible blends of polystyrenes and polyphenylene oxides (PPO) commercially available as Norel from General Electric Company; polyacetals (POM); polymers of acrylic acid, methacrylic acid, acrylic esters, and methacrylic esters; polyamide-imides; polyacrylonitriles; polyarylsulfones; polyester-carbonates; polyether-imides; polyether-ketones (PEK); polyether-ether-ketones (PEEK); polyalphaether ketones (PAEK); polyether sulfones; polyphenylene sulfides; polysulfones; nylons; anionic and cationic exchange resins, combinations of any of these polymers as well as recycled mixed plastics and the like. Preferred polymers include polyethylene, polypropylene, and polystyrene. A highly preferred inert media is high density polyethylene such as BC 100 manufactured for Bubble Clear of Cleveland, Ohio. Such a media has a surface area of approximately 10,600 square feet per cubic feet, a pore size of approximately 25 microns, a dry weight of approximately 20 pounds per cubic foot, a density or specific gravity of 0.8 grams per milliliter, a porosity of 32% and a particle size of approximately one quarter inch by one quarter inch as in the form of a cylinder.

Another advantage of the inert media of the present invention is that it can be readily recycled and reused over and over again. The particles generally have a narrow particle size distribution that provides for uniformity of moisture and air contact throughout the entire profile of a growing environment that permits plants to have uniform root growth and plant growth so that any crop can be harvested at one and the same time. Alternatively, the plurality of media can have non uniform characteristics such as surface area, particle size, pore size, porosity, and the like since specific crops may require diverse media to achieve good plant growth.

Naturally derived media particles are avoided by the present invention. Such particles include common hydroponic media including expanded clay pebbles, Perlite®, CoCo-Coir, Rockwool, and the like. By "naturally derived" it is meant that such media is obtained from nature and is not synthetic such as the present invention's polymeric media. Naturally derived media are adversely affected by freeze and thaw aspects of nature. That is, when frozen or thawed, they disintegrate, i.e. they fall apart or crumble and turn to dust over time. Thus, they become ineffective with regard to growing plants thereon, and cannot be reused. Hence, the present invention is free thereof. If such natural inert particles are utilized, the amount thereof is very small, as generally about 5% or less, desirably about 1% or less, or about 0.1% or less, and preferably nil, that is no particles at all, based upon the total amount of the synthetic inert media particles of the present invention, by volume.

Another important aspect of the present invention is that synthetic foam boards, blocks, or other shapes that have cutouts therein so that pots can be placed therein are not utilized, since they do not relate to a floating bed or mass. That is, the floating beds of the present invention are free of such synthetic foam boards, etc., such that any amount thereof is generally less than about 5%, desirably less than about 3% or about 1%, and preferably nil, that is none, based upon the total volume of the floating, inert media of the present invention. Moreover, such undesired items do not have open micropores that extend throughout the foam article, and do not have high surface area, and the like. Accordingly, they lack the advantages of the present invention as set forth hereinabove with respect to high surface area, low specific gravity, micropores, and small particle size.

Figure 2:
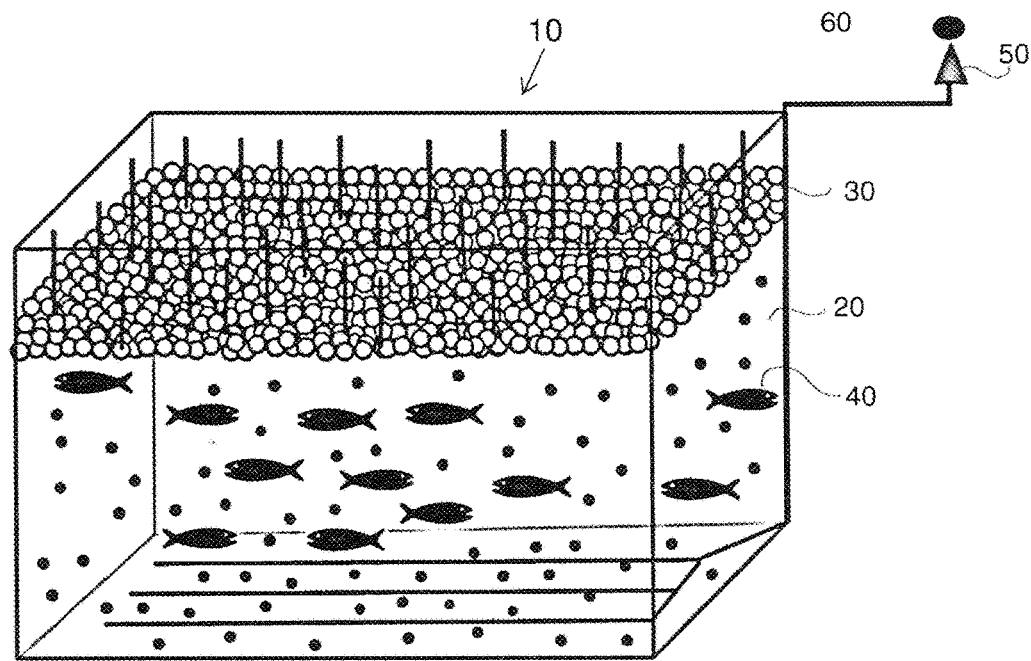
FIG. 2 is a perspective view of a schematic showing the present invention for utilizing waste water from a fish tank to serve as nutrients for growing various plants such as vegetables.

The inert media particles of the present invention of course, float upon the aqueous environment and often many of the particles are contiguous with one another, especially in a calm aqueous environment, for example where there are no waves. However, the inert media particles can also be randomly distributed, or generally all be contiguous with one another when sufficient amounts thereof are utilized such as is shown in FIGS. 1 and 2.

The floating mass of the inert media of the present invention in an aqueous environment is ideally suited for growing one or more different types of plants, as well as other biological matter such as one or more types of algae, and the like. The media can grow multiple types of flora at the same time. Growth of the flora is only limited by the amount of dissolved nutrients/pollutants in the water body. Examples of plants include various vegetables such as tomatoes, cucumbers, squash, peppers, lettuce, beans, and the like. Root crops such as ginger, potatoes, and carrots can also be grown. Medical plants can also be grown such as black mustard, betel nut palm, night shade, common birch, piceapple, barberry, Grecian foxglove, woolly foxglove, pheasant's eye, red chamomile, as well as marijuana (cannabis) in States where the same is legally allowed. Other plants include various herbs such as anise, basil, cilantro, coriander, dill, garlic, mint, oregano, rosemary, sage, tarragon, and thyme. Various different types of foliage can also be grown such as ferns, aloe, lemon grass and the like. Flowers include tulips, daisies, perennials, roses, daffodils, and wildflowers, and the like. Aquatic plants include seaweed, kelp, and the like. Of course, any combination of the above can be utilized.

Examples of different types biocrops including algae such as any of the hundreds of different types thereof including brown, red, green, and can be utilized as food supplements, e.g. Carrageenan, and Agar. Other biocrops include soil conditioners, animal feed, as well as numerous minerals, vitamins, proteins, lipids, and essential amino acids. Also, any combination of the above can be utilized.

Still other specific types of environmental friendly plants that reside in the above classes include Mustard greens, Pumpkin Vines, Alpine pennycress, blue Sheep pennycress, Blue Sheep Fescue, Smooth water hyssop, sunflower slurp, bladder campion, willow tree, geraniums, tobacco, maize, alfalfa, wheat, clover, safflower, rice, sweeteners, hops, anti-oxidants, plants and the like. These plants have unique values in that they are helpful in environmentally cleaning up abandoned or old factory sites, removing unwanted toxins or compounds from the soil, and producing helpful oils or nutrients for medicinal and pharmaceutical purposes with respect to human beings. For example, Mustard greens can be used to remove excess lead from clean-up sites. Pumpkin vines can be used to clean up old factory sites. Alpine pennycress can be used to clean up abandoned mines. Hydroponically grown sunflowers can be used to remove radioactive metals from nuclear plant sites. Blue Sheep fescue can be used to clean up lead, as does water ferns and members of the cabbage family. Smooth water hyssop takes up copper and mercury, while water hyacinths absorb mercury, lead, cadmium, zinc, cesium, strontium-90, uranium and various pesticides. Bladder campion accumulates zinc and copper, while Indian mustard greens concentrate selenium, sulfur, lead, chromium, cadmium, nickel, zinc and copper. Willow tree slurps up copper, zinc, cadmium, selenium, silver, chromium, uranium, petrochemicals and many others. Geraniums can absorb large quantities of heavy metals from contaminated soil and are special in that they can absorb large quantities of various poisons. Toxins or metals can be extracted by the plants that are burned and the ashes melted. Algae can be grown to produce oil and to remove nutrients from water. Pharmaceuticals can be obtained through growth of tobacco, maize, alfalfa, safflower, rice, and the like. Cannabis (marijuana) can be grown for medicinal purposes. Rice and vegetables are grown for food consumption. Hops are used in making beer. Various flowers (Roses) and plants such as acacia, sage, yarrow, aloe, witch hazel, and bayberry are used astringents and to treat burns. Invasive species of plants known for their uptake of pollutants, nitrogen, phosphorous and the like can now be grown for phyto treatment of wastewater and contaminated water bodies without risk to the surrounding environment by using confined island floating media. Of course, any combination of the above can be utilized.

The use of inert media that has a specific gravity of less than 1.0, as noted above, is an important aspect of the present invention inasmuch as floating layers or beds of media are formed that allow plants to grow thereon whereby healthy root systems develop around the inert media particles and also have free, ready access to water and to one or more nutrients contained therein. That is, the roots do not penetrate into the pores of the media since they are too small and yet the pores can readily hold various nutrients, air, oxygen, and the like. Moreover, the floating mass provisions of the present invention also provide a base for the various plants and biomatter to be grown thereon and thereafter can be readily harvested. That is, there is great uniformity of growth with regard to the location of the various roots, stem portion, and harvest portion of the vegetable or other desired aspects, such as uniform harvest height. Thus, the system is highly efficient with regard to yielding crops that are generally at the same desired state of maturity. Upon harvesting, the roots can be readily separated from the inert particles since, as noted they are located about the same and do not generally penetrate into the pores. The inert media is then recycled, and the roots can either be used, since they generally have high nutritional value, or they can be discarded as fertilizer for soil plants, and the like. Another advantage is that when the crop is harvested, there is full access to the entire plant. For example, in typical farming, the plants are chopped at the base of the stalk when it meets the soil. However, in the present invention, the full or entire stock can be harvested, thereby yielding more crop per item or plan harvested.

A unique aspect of the present invention is that due to the specific gravity or buoyancy of the inert media particles, a unique form of hydroponics is formed whereby inert media can be poured into water and exists at a desired depth or layers of the particles, i.e. partially submerged with an unsubmerged floating portion. When aerated, the floating mass continuously provides dissolved oxygen to the various particle pores where it can be retained or utilized. Of course, the specific gravity can be changed so that the floating inert media bed has a high above water surface profile or has a lower profile depending upon a particular plant requirement.

Another important aspect of the present invention is that the floating, inert media particles can be in the form of an island, that is, a fixed or confined floating inert particle bed wherein the perimeter of the same is a barrier that envelopes, circumscribes, or otherwise encloses a desired area desirably having a plurality of contiguous inert media particles that can also be located one on top of another. That is, the barrier is porous so that the aqueous environment such as water, polluted water, waste water, etc. can flow therethrough, but not the inert media. The barrier can be netting, or in lieu thereof, the particles can be contained by a connected, contiguous network of floats, or connected buoys, or other type of floatable barriers, and the like. The islands can either be free floating, or mechanically controlled as by the barrier being connected to a submerged weight, or even a device that can move through, e.g. a mini submarine, or along the bottom of a lake, a pond, and move the island therewith. The barrier is located on the aqueous environment surface, and also extends above, and below, the surface so that the inert media bed is totally confined within the barrier. A unique advantage of floating islands, especially those that can be controlled to move from one location to another, is that the amount of sunlight admitted to the water is reduced thereby greatly reducing the growth of algae and other undesired organisms. Movable islands are often desirable in that they also produce habitats that contain sufficient sunlight to grow plants and other matter that serve as food for aquatic animals such as fish.

Various nutrients that are well known to the art and to the literature can be utilized to promote plant growth and they can be added directly to the aqueous environment and/or contained in the pores of the inert media particles. That is, the porous inert media particles can readily absorbed and provide nutrients to various plants, bio-matter, and microorganisms. Generally any type of nutrient can be utilized such as one or more fertilizers that contain nitrogen, e.g. nitrates and/or nitrites, phosphorous, and potassium as well as other minor component minerals such as copper, zinc, iron, boron, manganese, magnesium, selenium, and the like. In addition to various fertilizers, the media can contain various helpful substances such as growth regulators, disease resistant compounds, bacteria, organic and inorganic carbon, and the like. Still another nutrient can be fecal matter such as that excreted by aquatic animals such as fish, more fully discussed herein below. Any combination of the above can be utilized.

The pH of the aqueous system of the present invention is generally important and typically ranges from about 4 to about 10 with from about 6 to about 8 being preferred. Also, according to the present invention, water of a high quality level, i.e. low in very undesirable compounds as noted above, while not being of a potable quality is nevertheless similar thereto and can be utilized for various purposes such as feeding farm animals, and adding to ponds, reservoirs, or confined containers containing fish. The treated water generally readily meets water discharge limits such as imposed by various states, or the EPA so that it is suitable for use for irrigation purposes, such as crops e.g. various grains, vegetables, fruit trees, and the like, watering lawns, golf courses and other grassy areas, as well as for washing cars, showers, toilets, and the like.

During the growth of the various plants or bio substances, the various fertilizers and other noted compounds can, of course, be added to supplement the aqueous environment whereby they are readily assimilated by the plants and provide continued growth.

Upon maturity as noted above, the floating biomass of the inert media containing plants and bio substances thereon in the form of a bed or layer can be readily harvested. Harvesting can occur as by manual, semi-automatic or automatic extraction of the biomass bed from the water-media tank/container, etc., followed by shaking/agitation of the mass to separate the loose media from the biomass with a final comb of the roots to extract nearly all remaining media.

With respect to growing various plants and biological matter, the mass or layers of the inert media of the present invention have the following attributes: The ability to grow flora and fish life in the same tank thereby reducing the system footprint; the ability to hydroponically grow in natural environments (zoo, pond, lake, river, or in controlled environment) and the ability to harvest more easily due to the design of the present invention without losing integrity of the floating growing matte; the ability to increase the fish capacity in a given water body; the ability to trap air and prolong the life of a controlled fish system in the event of air loss; the ability to easily deploy and easily remove floating matte as needed for harvesting or due to seasonal change; the ability of microorganisms embedded in surface area of the inert media to convert ammonia to nitrite and nitrate for plant utilization; the ability to decrease water loss due to evaporation by covering a water body; the ability to grow flora used in industrial water treatment for purposes such as heavy metal, precious metal, sulfur, magnesium and other chemical uptake, the ability for farmers with limited land availability to directly grow a high yielding crop on existing water bodies; the ability to be used in ponds, streams, rivers, and lakes with respect to different types of flora that can be grown on the floatable inert particles while simultaneously removing nutrients in the water body such as nitrogen and phosphorus that can cause unwanted algae (blue-green) growth; and the like.

In order to achieve favorable results with regard to growing plants and/or achieving bioremediation, it is an important aspect of the present invention that the inert media particles have the above-noted properties of high surface area, pores that are of a micro size, and the particles being generally of a small size, and have a continuous pore structure. The amount of particles can be such that it covers only a portion of the enclosed aqueous area such as a floating island, or it can completely cover the entire surface thereof as shown in FIGS. 1 and 2. Desirably, the inert media bed have multiple layers such as a few or several layers, e.g. 1 or 2 to 50; 2-20; 3-15, or 3-10, that aid in stabilizing the floating mass thereof with respect to growing plants. That is, while the upper one or more layers of the floating mass is dry, the lower one or more layers are submerged in water. This presents an ideal situation for plant growth in that the plant roots grow around and on the inert media and extend downward into the aqueous environment. Due to the depth of the multiple layers of the inert media particles, and the fact that particles are contiguous with one another, they have sufficient strength to maintain or hold the plants such that the stems thereof are generally in an upright or vertical position.

Due to the pore structure of the inert media particles, air or oxygen is contained or trapped therein and supply an essential ingredient to the plants, biological matter, remediation of waste or polluted water, or aquatic life. Additionally, as previously noted, air can be supplied to the aqueous environment in any conventional manner as by being piped into the environment to aerate the same. Due to the packed bed or floating mass of particles, much lower amounts of air and/or oxygen are needed to sustain a vibrant, growing system.

The confined embodiment of FIG. 1 that specifically relates to a container, as noted above, can generally be applied to any aqueous environment such as a pond, a lake, and the like, wherein the floatable, inert media generally extends across the entire, enclosed or confined, aqueous surface where it is maintained in the form of a cover. Such embodiment is suitable for generally any waste or polluted water by bioremediation treatment system, is suitable for growing generally any type of plants, including vegetables, flowers, fungi, and various pharmaceutical compounds that serve as or can be converted into medications for human beings. Algae can also be grown, although the present invention is very effective in preventing and/or abating or eliminating algae in ponds, tanks, enclosures, lakes, and the like.

With respect to bioremediation, the present invention is suitable to waste water, polluted water, and a non-biological waste environment. Bioremediation has at least the following attributes: the ability to clean and treat water bodies with biologically dissolved food sources such as BOD and organic nitrogen sources, nitrates and nitrites, phosphorous, and also pollutants, oil eating microorganisms, and phyto life (crops, vegetation and flora); and varying types of flora (plants) on the inert media; the ability to be inoculated with microorganisms to deal with specific pollutants in water; the ability to not only house microorganisms, but also accumulate nutrients in the non-dusting, micro-pore, hydrophobic/hydrophilic buoy like inert media; the ability to grow flora used in waste water treatment of waste streams such as landfills leachate; the ability to treat wastewater or polluted water produced by farm animals in lagoons, ponds, tank, and the like; the ability of wastewater or polluted water treatment plants to reduce the footprint required to treat wastewater effectively since the floatable, inert media provides the missing surface area for micro-organisms in a given system; the ability of waste water treatment plants to better withstand chemical and biological shocks since the microorganisms situated in the pores of the floatable, inert media will not wash out of the system; and the ability for wastewater or pollution treatment plants to significantly reduce aeration cause since the floatable, inert media will capture and retain air bubbles in the water body thereby providing continued dissolved oxygen levels in the water body, and reducing the need for high volumes of aeration. Another advantage of the present invention is the aerobic bioremediation of waste or polluted water utilizing various microorganisms in association with oxygen. Another important aspect of the present invention is the ability to treat and remove algae from water sources by depleting algae of necessary nutrients (nitrogen and phosphorus), and the ability to eliminating growth thereof by blocking sunlight from entering the aqueous environment. However, the present invention does not relate to anaerobic bioremediation and the same is therefore excluded from the present invention.

Waste water compositions can be derived from various aqueous sources and include sewage, fecal matter, and excrement from human beings and animals such as chickens, turkeys, cattle, sheep, pigs, horses, or fish, or any combination thereof. In addition to waste water, the present invention also relates to the bioremediation of polluted water, that is environmentally contaminated water as from industrial plants, factories, businesses, and the like. Non-biological compounds that can be bioremediated include various chemicals, corrosive compounds, and the like including various hydrocarbons such as hexane, benzene, toluene, xylene, and the like, and alcohols such as ethanol, methanol, phenol, and the like, and nitrogen-containing chemicals such as ammonia, aniline, morphiline, and the like Examples of corrosive compounds include sulfur-containing compounds such as $H_2S$ and the like, and carbonate-containing compounds such as lime and soda and the like, nitrate-containing compounds such as fertilizer and the like, and chloride-containing compounds such as table salt and the like.

It is an important treating aspect of the present invention to utilize one or more different types of microorganisms to bioremediate waste water, polluted water, biologically dissolved food sources, organic nitrogen sources, etc., as set forth above. An optional use of one or more different types of microorganisms is to treat environments such as aqueous systems utilized to grow one or more plants, or aqueous systems to raise aquatic life such as aquatic animals, for example fish. Thus, if the aqueous environment has some undesirable waste matter therein, the one or more microorganisms set forth below can be utilized to remove, that is destroy, eradicate, breakdown, eliminate, digest, or react with, etc., said waste or other undesirable matter. Similarly, if the present invention relates to raising aquatic animals such as fish, then also one or more different types of microorganisms can be used to remove, that is destroy, eradicate, breakdown, eliminate, digest, or react with, etc., any undesirable waste matter.

The microorganisms that are utilized in the bioremediation of the above wastes generally work through several different mechanisms that destroy, eradicate, eliminate, digest, breakdown, react with, etc., as by formation of complexes, splitting of molecules, formation of new compounds such as carbon dioxide, water, sulfur dioxide, nitrites, nitrates, and nitrogen and the like. Preferably, numerous and different types of one or more microorganisms such as bacteria, Protozoa, spores, or fungi, are utilized with the floating mass of a plurality of inert media particles of the present invention so that a highly diverse microbial population exists to effectively treat most, and even all of the various types of the waste components found in the aqueous waste composition. Desirably, microorganisms are utilized that are found in nature such as in the soil, trees, ponds, lakes, streams, rivers, grains, plants, mold, spores, fungi, and the like. Microorganisms are generally defined as being cellular and being able to replicate without a host cell. One desired source of microorganisms are various bacteria that are known to remediate various waste compositions. The different types of bacteria are numerous and known to the art and to the literature and thus include one or more bacteria to biodegrade carbonaceous compounds such as *pseudomonas* species such as *Pseudomonas vesicularis, Pseudomonas putida* and *Aeromonashydrophila, Brevibacteriumacetylicum*, bacteria to biodegrade nitrogen-containing compounds such as *Nitrobacter* species such as *Nitrobacterwinogradskyi* and *Nitrosomonas* species such as *Nitrosomonaseuropaea* and bacteria to biodegrade sulphur-containing compounds such as *Thiobacillus* species such as *Thiobacillusdenitrificans* and the like. Various fungi can also be utilized such as mushrooms, molds, mildews, smuts, rusts, and yeasts, and any combination thereof. Another type of microorganisms is Protozoa that consist of unicellular organisms that range in size from sub-microscopic to macroscopic. Types of protozoa include one or more of sarcomastigophora, labyrinthomorpha, apicomplexa, microspora, acetospora, myxozoa, and ciliophora. Preferably at least two or three, and even four or more different types of microorganism exist within the floating mass of one or more layers of the inert media particles of the present invention inasmuch as the same has been found to remove, e.g. destroy, eradicate, eliminate, digest, breakdown, react with, etc., various carbonaceous compounds, various nitrogen containing compounds, various sulfur containing compounds, various toxic compounds, and the like.

In order to be effective, the various microorganisms have to be attached, contained, captured, bound, etc., by various substrates so that they are not washed away by the flow of the aqueous waste composition as it flows through a treating apparatus such as a reactor or the floatable inert media. In order to yield effective and efficient results, the inert media of the present invention has various desirable attributes, as set forth hereinabove and fully incorporated by reference, as high surface area such as about 4,000 to about 20,000 square feet per cubic foot, micropores having an average width of from about 10 to about 50 microns, and the inert media being of a small particle size, i.e. from about 0.0001 to about 0.5 cubic inches, and generally have an open pore structure, a porosity of from about 20% to about 40% based upon the total volume of the particle, and a specific gravity of from about 0.65 to about 0.85. The pores desirably exist not only on the surface of the substrate, but also in the interior thereof and entirely there through such that the substrate often has a "continuous open pore structure".

As noted above, an important attribute is that multiple types of microorganisms, for example anywhere from 2 to about 8 or and even more than 100, or any combination thereof, are applied, attached, fixed, etc., to the inert media particles in any of the number of ways, modes, or surface characteristics such as physically or physico-chemically. Physical attachment can occur to the media having a rough surface to help mechanically secure the microorganisms thereto. Physico-chemical attachment can occur through dipolar interaction of the microorganisms to the media believed to be through Vanderwalls forces and the like. Physico-chemical attachment can also occur through a cation or an anion microorganism portion respectively with an anionic or a cationic portion of the media attachment can also occur through polar or non-polar bonding. Similarly, ionic or non-ionic portions of the microorganism can be attached via ionic or non-ionic bonding. Silica ($SiO_2$) provides anionic surface characteristics while alumina ($Al_2O_3$) provides cationic surface characteristic. Ion exchange resins (cation, anion) can also be used to immobilize a variety of microorganisms utilizing anionic and cationic attractions. Similarly, hydrophobic portions of the microorganism can be attached to hydrophobic portion of the media or via a hydrophilic-hydrophilic alignment, etc. While polyethylene and Teflon provide hydrophobic surface characteristics various acrylic polymers provide hydrophilic surface characteristics. The above attachment of the microorganisms to the porous media is such that the microorganisms are maintained in place throughout the bioremediation process. The microorganisms can be added as by simply dispersing the same in an aqueous waste water medium whereby they inherently attach to the floating mass of the plurality of inert media particles, or they can be added separately to the inert media particles before the same is added to an aqueous waste water system.

The present invention is also suitable with regard to an aerobic bio-system for marine or aquatic animals such as fish, snails, crustaceans, water born insects, mollusks, and the like. The present invention also has the ability to help farmers grow fish and crops in the same space thereby reducing the footprint required for production of aquaculture and aquaponics; and the ability to help fish farmers significantly reduce expenses associated with filtration and biological treatment of fish waste in a recirculating aquaculture system and aquaponics systems via producing revenue generating crops; and the like.

Thus, an end use of the floating mass of inert media particles of the present invention is with respect to water plants, or to fish tanks or fish farms wherein fish are raised and subsequently harvested. An embodiment of such an end use is set forth in FIG. 2 wherein an enclosed fish tank or fish farm 10 contains generally a plurality of inert media particles 30 that float upon an aqueous medium such as waste water 20 having fish 40 therein that, of course, defecate or excrete matter into the water. In this embodiment, plants are raised upon the floating mass of the inert media particles. An aeration pump 50 through pipe or flow line 60 can be utilized to supply an effective amount of air to the tank. Another flow line (not shown) can be used to pump excess fecal matter out of tank 10 for many desired uses such as to pump the fecal matter into another confined area whereby it is utilized as nutrients for growing plants, or as to fields, gardens, etc., wherein it can be utilized as fertilizer.

In such a typical scenario, the fish are fed with fish food, as on a regular basis, that is commercially available and they subsequently eject fecal matter. Unlike conventional systems, wherein the waste water generated by the fish must be cleaned as by removing the fecal waste water or substantial amounts thereof, and also treated or replaced to remove ammonia therefrom that can harm and kill the fish, the same is not required. Rather, the plants, via their roots that cling around about and below the inert media particles, utilize the fecal matter as nutrients to typically grow any type of desired plant. In other words, the plants eat, consume, convert, breakdown, reduce, digest, or decompose the fecal matter and thus remove it from the aqueous environment. The plants can then be harvested and subsequently reseeded so that the process of raising the fish is a generally continuous process or system. Thus, as noted, as well as in actual tests, there is no need to remove the water and purify it and return a limited portion thereof, or to utilize entirely new clean, fresh water. The floating mass of the inert particles, as noted, generally contain a plurality of layers so that plants growing therefrom are stabilized and can grow in an upward or vertical manner as if planted within soil. The roots of the plant, as noted, are generally sufficient to utilize all of the excreted matter. In this manner, the water within the fish tank or fish farm enclosure is kept clean and free of ammonia. Since the floating mass of the inert media can desirably cover the entire surface of the water, very small amounts thereof are lost due to evaporation. Rather, only air is required to be pumped into the tank to aerate the same to enable the fish to breath as well as to add oxygen to the floating mass inert media system and retain oxygen within the pores of the media particles and so forth so that the roots obtain oxygen therefrom. Aeration costs are significantly reduced since the floating mass of inert media particles will capture or absorb and generally retain air bubbles in the water body thereby reducing the need for high volumes of aeration. When the fish are sufficiently large enough to be harvested, they can be removed from the tank or enclosure and small fish added thereto. The plants can be harvested when ready. Another advantage is that the top layer of the floating mass of media particles is out of the water while the lower layers are submerged in the water. However, the plants have the ability to directly pull nutrients from the water body without risk of rotten the stem and leaves. Yet, due to the wicking nature of the inert media particles, the top exposed layer generally remains moist. Still another advantage is that the plant grown and harvested from the floating mass of media particles can be grass like flora or other animal feed crops that can be fed directly to cattle, chickens, turkeys, horses, sheep, goats, pigs, and other farm animals.

Another important advantage of the present invention as represented by FIG. 2 is that if there is an excessive fecal matter that is not required by the plants for typical growth, the same can be removed as by pumping it out of the enclosure and utilize it for fertilizer for farm fields, gardens, etc., or it can be fed to other enclosed or confined aquatic areas containing inert media for plant growth where it serves as nutrients therefore.

The advantages of such aquatic farming are enormous. There are multiple ways farmers can handle waste. For example, the media can be directly applied to a pond and a crop can be grown thereon that can be harvested to feed the animals. Alternatively, the aquatic animal fecal matter can be bioremediated without the same being discarded to a costly private or municipal slurry system wherein it must be treated and then disposed of in a manner compliant with environmental laws. Businesses can grow fish and crops in a reduced small space as compared to conventional aquaculture and aquaponics systems. The expense associated with filtration and biological treatment of the fish waste is also significantly reduced. Another advantage is that bioremediation of the fish fecal matter as well generation of crops is accomplished in one area that yields more land available for conventional farming in this ever increasing populated world. Still another advantage of the present system is that nitrification of the fish tank or fish farm environment is readily accomplished so that there is very little or no dead fish, and also that no expensive nitrification system is required. Nitrification is generally accomplished is two stages with two separate groups of nitrifying bacteria being utilized. The first step converts deadly ammonia with regard to fish survival to nitrite which is accomplished by utilizing ammonia-oxidizing bacteria (AOB). Such bacteria are referred to as nitrosomonas. The second step is the conversion of nitrite to nitrate and is accomplished by nitrite-oxidizing bacteria (NOB). Such bacteria are referred to as nitrobacter. Chemically, nitrification is accomplished by AOB bacteria converting ammonia ($NH_3$) into nitrite ($NO_2$). Subsequently, NOB bacteria converts the nitrite ($NO_2$) to nitrate ($NO_3$).

Since the microorganisms of the fish tank or fish farm generally are situated in the pores of the floating mass of the inert media particles and generally do not wash out therefrom, the result is that waste water treatment plants can better withstand chemical and biological shock from other naturally occurring events.

Figure 3:
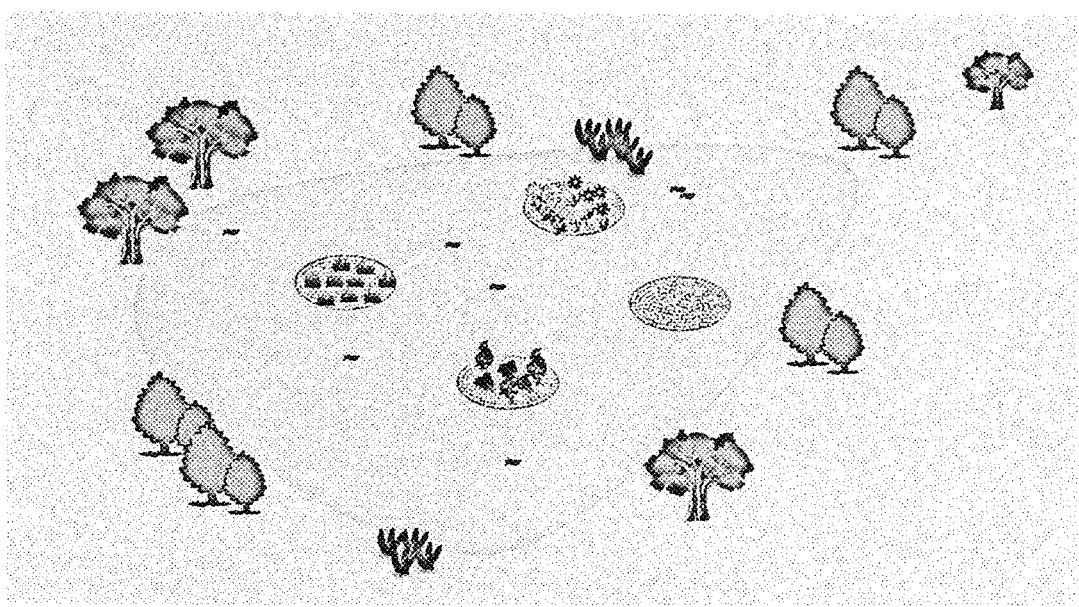

FIG. 3 relates to another embodiment similar to the fish tank of FIG. 2, wherein one or more floating islands, surrounded by a floating barrier can exist within a pond and have the same attributes of that as described with respect to FIG. 2, hereby fully incorporated by reference. Thus, aquatic life can exist within the pond wherein the same bioremediation of waste emitted by fish can be utilized to grow plants within the islands as well as to utilize and eliminate fecal matter emitted by said aquatic life. Similarly, the build-up of algae can be abated, eliminated, or prevented. The mechanism for such an aerobic system is generally the same as with respect to FIG. 2, and is hereby fully incorporated by reference.

In addition to aquatic farming such as fish farming, the present application is very applicable to other types of non-aquatic animal farming including chicken farming, turkey farming, sheep farming, cattle farming, pig farming, and the like. A general summary of such farming comprises raising the animal for a part or total life thereof within a building such as a barn or other enclosure, structure, etc., wherein the floor, e.g. concrete, has slits or openings therein through which fecal matter emitted by the animal can fall through, or otherwise be scraped, shoveled, or directed therein, as by the use of a water hose. Such non-aquatic animal fecal matter can then fall into a tank such as a hopper tank that has sloping bottom walls to a central outlet whereby the fecal matter can be collected in a waste collection tank. From there it can be fed such as by pumping the aqueous fecal solution to one or more collection tanks that can be arranged in order, i.e. sequentially, that contain the inert media particles of the present invention that either contain one or more types of microorganism therein that grow on the inert media, or that the roots of plants can eat, consume, digest, or decompose the fecal matter, or both.

The following paragraphs describe different types of end uses or applications in which the present invention can be utilized, it being understood that the same merely serve as examples or descriptions of particular uses of the present invention with the scope of the invention being set forth by the appended claims.

Figure 4:
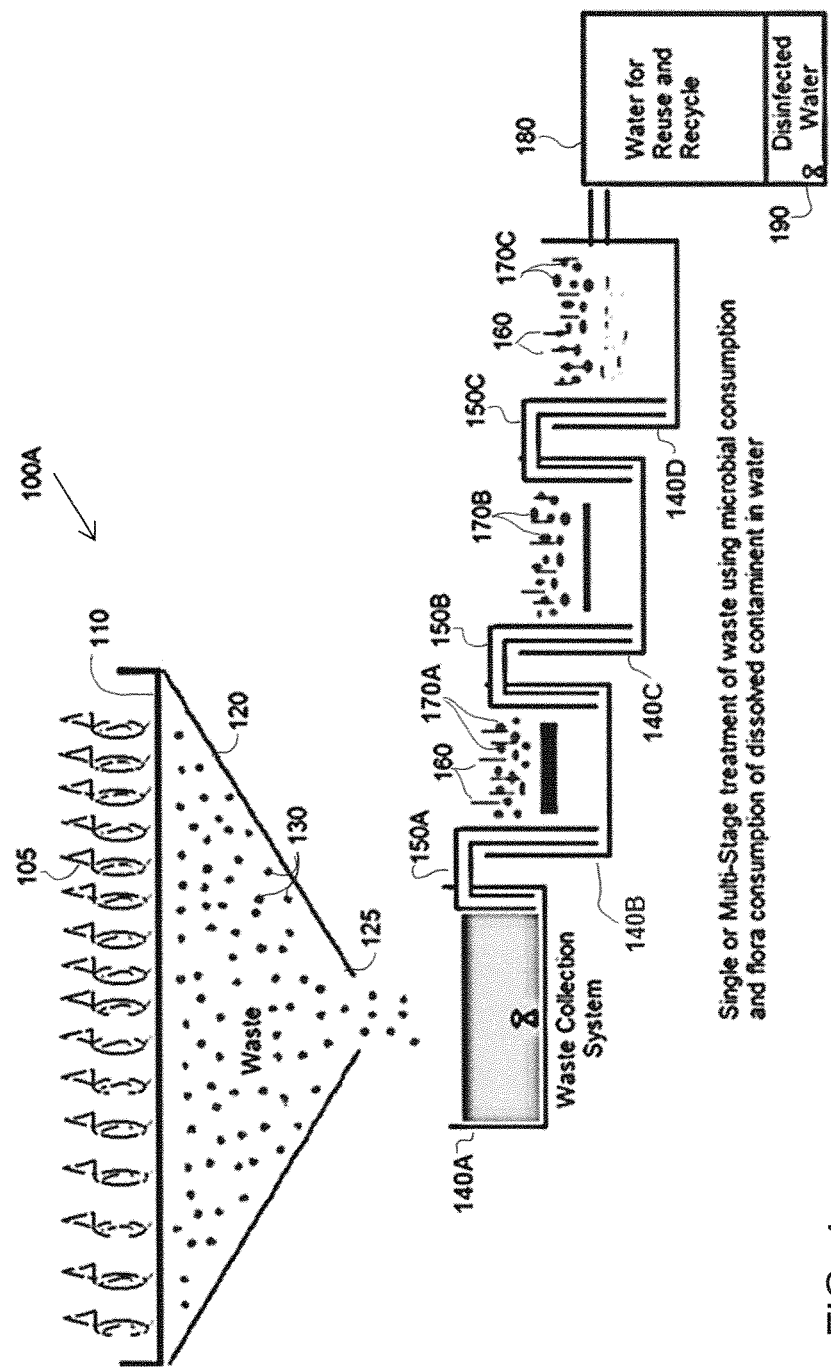
FIG. 4 is a schematic view of a multi-stage treatment of waste water utilizing a floating mass of inert material of the present invention.

FIG. 4 relates to an animal farm 100A that contains a barn or other structure, not shown, that can house animals 105 such as chickens, turkeys, cattle, sheep, pigs, and the like. The barn or other structure has a floor 110 that has slits or openings therein, not shown, that open to hopper tank 120 that desirably has sloped bottom walls therein. The fecal matter 130 that falls, or is scraped, or washed as with water, etc., into hopper tank 120 moves towards to the bottom of hopper and exits through hopper discharge area 125 into waste collection tank 140A. Depending upon the consistency or viscosity of fecal matter 130, it can be modified to a flowable mass as by the addition of water, not shown. On a continuous basis, a periodic basis, or any random basis, fecal matter 130 collected in waste collection tank 140A can be transferred to one or more sequential collection tanks 140B, 140C, etc. via pipes 150A, 150B, 150C, etc., and pumps, not shown, from the prior waste collection tank. Each subsequent collection and treatment tank 140B, 140C, etc., contains a plurality of inert media particles 170A, 170B, 170C, etc., as described hereinabove, that float upon the surface of the fecal matter mixture and can cover a portion, or the entire tank surface area. Inert media particles 170 can contain one or more microorganisms as within the pore structure thereof whereby they eat, digest, or otherwise reduce the amount of fecal matter in the tank, with successive tanks containing less fecal matter per unit area, until all of the fecal matter is digested. Additionally, or in lieu of microorganisms, various types of plants 160, as noted hereinabove and hereby fully incorporated by reference, can be grown on inert media particles 170 whereby the roots thereof digest, eliminate, eradicate, convert, breakdown, etc., or otherwise reduce the fecal matter into harmless, generally non-odorous compounds. The bioremediation process of one or more successive treatment stages such as tanks 140B, 140C, etc., result in a relatively pure, clear, non-odorous water that can be collected in holding tank 180, as for example for reuse and/or recycling to the barn or structure, or to subsequently wash additional fecal matter into hopper tank 120. Other examples of reuse of the water include water for crops, for example irrigation, and watering or spraying plants including grass and lawns, and the like. If desired, the water in holding tank 180 can be disinfected through the utilization of conventional disinfection systems or processes such as the use of chlorine as in disinfection tank 190. According to various health standards such as those imposed by the Environmental Protection Agency (EPA) in the United States, such purified water can be used for drinking, cooking, bathing, toilets, and the like.

Figure 5:
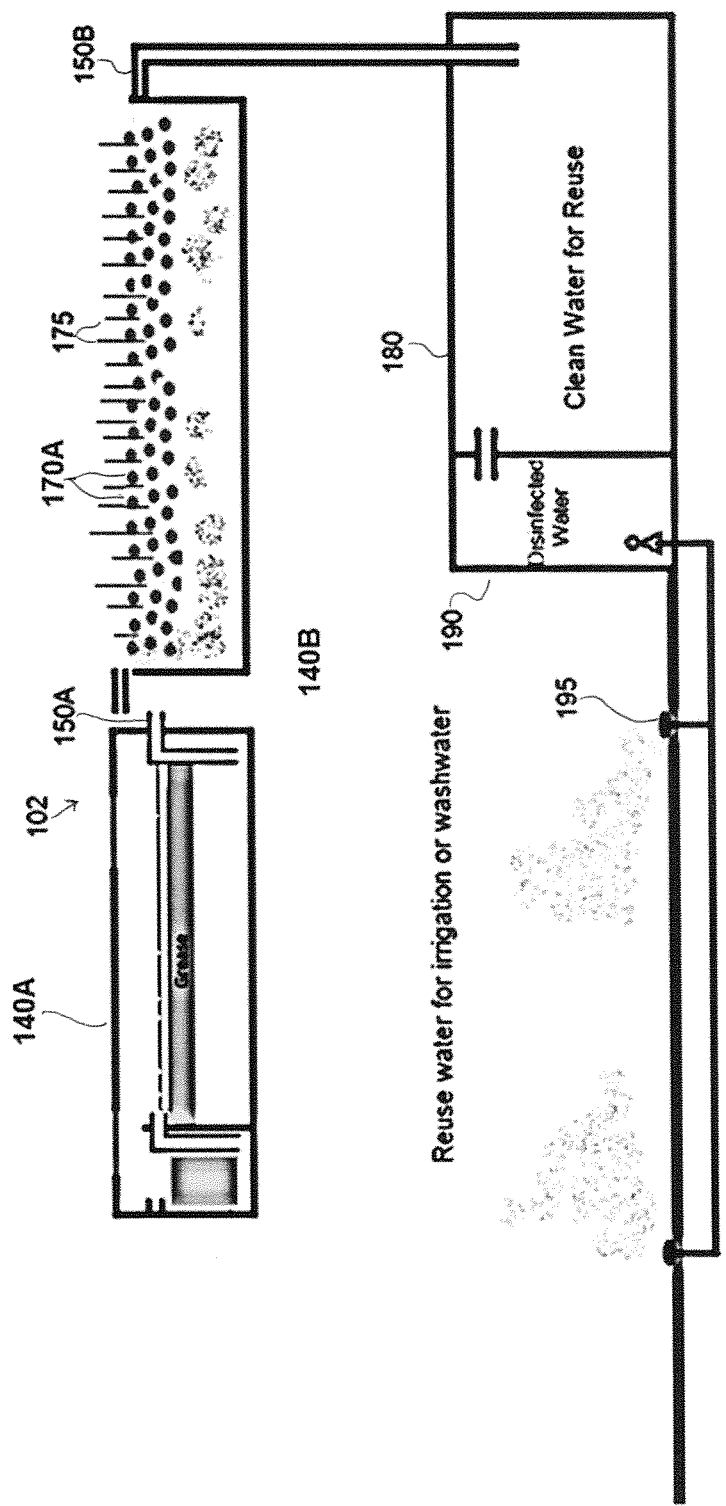
FIG. 5 is a schematic view of the present invention wherein greases, fats, oils, and the like, are treated by the floating inert particles of the present invention.

FIG. 5 relates to another type of end use for the present invention wherein container or structure 102 relates to the retention of one or more greases, fats, oils, and the like, as in waste collection tank 140A. The greases, fats, etc., are transferred via pipes, not show, into tank 140A from various sources such as a kitchen, a cafeteria, a restaurant, and the like. Heretofore, such greases, fats, etc., were generally sent to a gravity separator wherein the floating fats and greases were sent to one tank and the remaining greases were sent to a second and/or third tank. Hot water was often utilized with surfactants to emulsify the greases. Such as system required excessive pumping. With respect to the present invention, collection tank 140A contains at least one pipe 150A that transfers the one or more greases, fats, and oils, and any water associated therewith into one or more sequential collection and bioremediation treatment tanks such as tank 140B to which generally has been added water and generally one or more different types of different inert media particles as described hereinabove, hereby fully incorporated by reference. As discussed hereinabove, collection tank 140B can contain one or more plants 175 that digest, breakdown, decompose, eliminate, etc., the greases, fats, and oil. Alternatively, and preferably, the inert media particles can contain one or more different types of bioremediation microorganisms as noted above such as different types of bacteria. In another scenario, inert particles 170 can contain both plants 175 there growing thereon, and also contain the microorganisms to bioremediate the grease, fat, etc. While only one bioremediation tank is shown in FIG. 5, additional bioremediation tanks can be utilized and arranged sequentially, or otherwise. The treated grease, fat, or oil, or any combination thereof, is transferred from the last bioremediation tank via one or more transfer pipes 150B by a pump, not shown, to holding tank 180 whereby the treated clean water can be reused for end uses noted above, for example as wash water, water for irrigation, water for watering lawns or golf courses, bathing, toilets, and so forth. As previously noted, the clean water in tank 180 can be transferred to tank 190 wherein it is disinfected by any conventional manner such as chlorination, as approved by the US EPA, whereby it can subsequently be used as drinking water, water for household uses, industrial uses, and the like. The use shown in FIG. 5 is for spraying lawns and the like via sprinklers 195.

Figure 6:
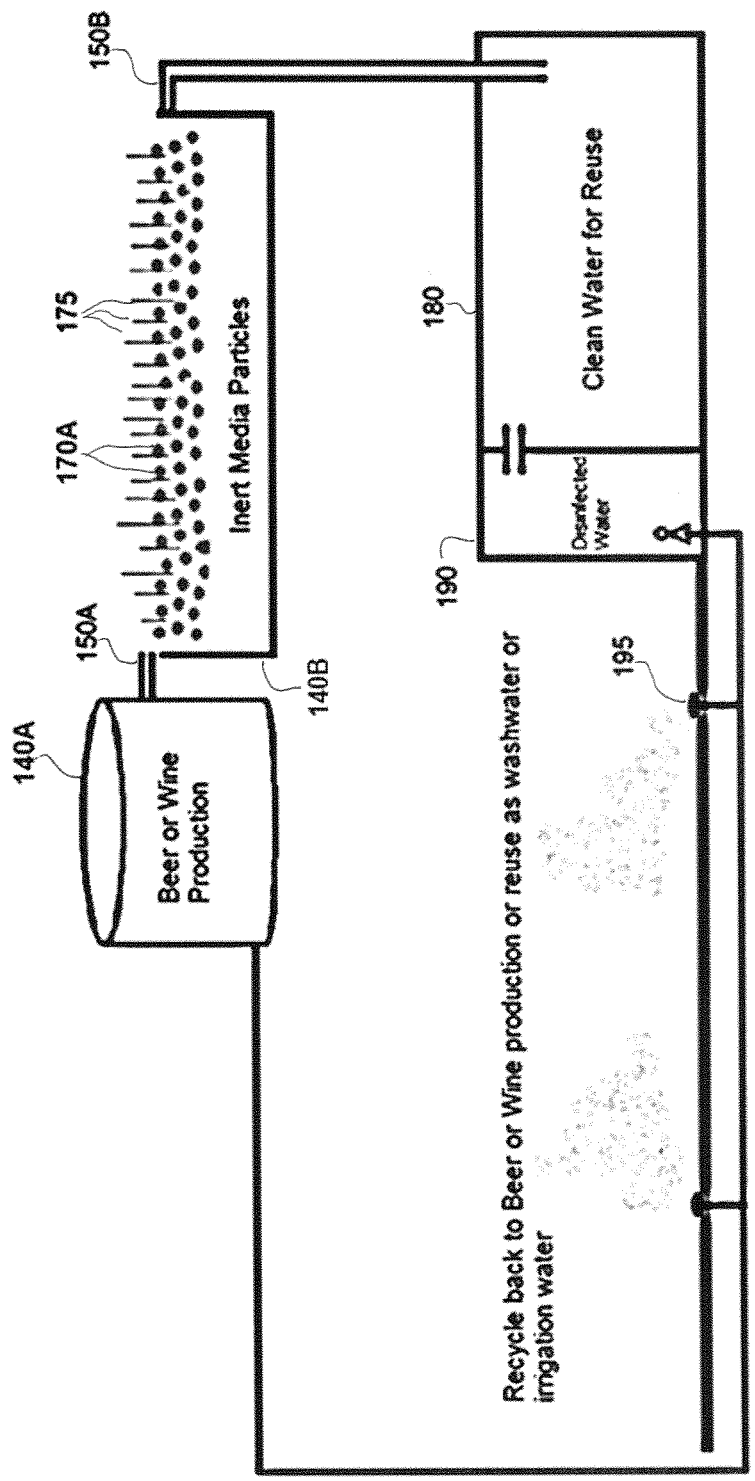
FIG. 6 is a schematic view of the present invention wherein waste water from alcoholic processes such as making of beer or wine is treated by the floating, inert media particles of the present invention.

FIG. 6 relates to another embodiment of the present invention wherein spent liquid as from beer, wine, or other alcoholic beverages are fed to waste collection tank 140A instead of being drained into a municipal sewage system for treatment. The spent liquid that inherently contains large amounts of water therein can be transferred via pipe 150A to bioremediation waste collection tank 140B wherein it is bioremediated by inert media particles 170A that can contain plants 175 thereon that digest or treat the alcoholic content as well as other non-water contents, or by bioremediation microorganisms that are contained within the inert bioremedia particles 170A, or both. As before, although only one bioremediation collection tank 140A is shown, there can be a series of such tanks arranged in parallel, and/or sequentially. Upon completion of the treatment, the purified water is piped via pipeline 150B to holding tank 180 that retains the purified water for various end uses, such as wash water, irrigation water, water for spraying lawns and golf courses, and the like. Alternatively and as noted above, the purified water in holding tank 180 can be disinfected within requisite EPA guidelines or other environmental guidelines to produce disinfected water in tank 190 whereby such water can be utilized as drinking water, household water for bathing, kitchens, toilets, and the like, as well as for industrial and commercial uses. In the embodiment shown in FIG. 6, the water is applied via outlets 195 to water lawns, plants, and the like.

Figure 7:
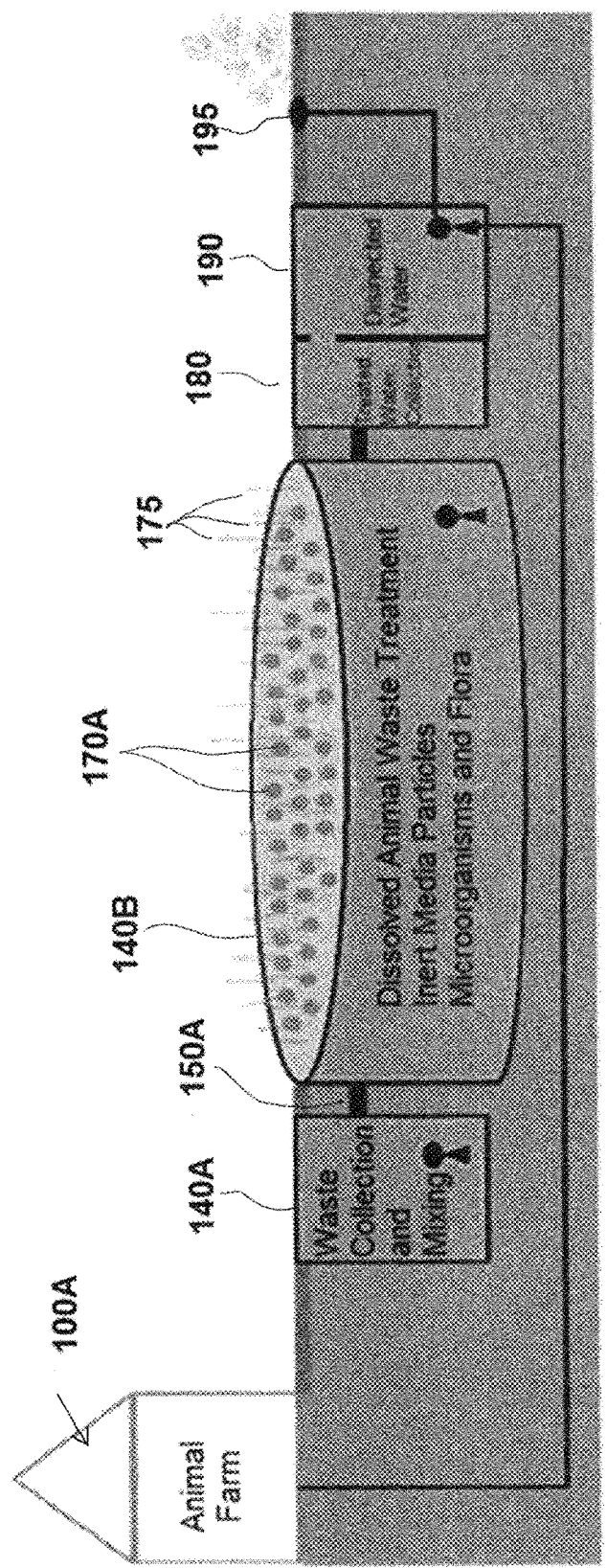
FIG. 7 is a schematic wherein animal waste as from a farm is bioremediated by floating inert media particles of the present invention that contain microorganisms.

In addition to the aerobic bioremediation system of an animal farm as shown in FIG. 4, a system can be utilized as shown in FIG. 7 wherein animal farm 100A can be a barn having a floor with slit openings therein for the fecal matter to fall through. Water can be added to the fecal matter to make it flowable and then pumped to waste collection tank 140A. In accordance with the description set forth above, hereby fully incorporated by reference as with regard to an animal farm, the farm waste material such as that from turkeys, cattle, sheep, pigs, as well as chickens, etc., can be pumped via pipeline 150A to collection tank 140B that contain the inert media particles 170A therein. As previously noted, the particles can have plants 175 growing thereon to the system and in the degradation, digestion, etc., of the fecal waste matter to harmless substances. Alternatively, the inert media particles can contain the various microorganisms noted above that bioremediate of the fecal matter to harmless substances. Often, both microorganisms and plants are utilized to purify the fecal-containing water. Upon sufficient treatment thereof, the treated and purified water is collected in holding tank 180 whereupon it can be subsequently used in various manners as noted above such as water for agricultural purposes, for example watering plants, or for irrigation, or for sprinkling onto a grass, lawns, and the like. As also previously noted, it can be disinfected in an appropriate manner such as by treatment with chlorine to detoxify any harmful substance therein whereupon it can be utilized as drinking water, water for household uses such as showers, toilets, cooking, or for industrial or commercial uses. As shown in FIG. 7, once the animal waste is collected in tank 180 and disinfected in tank 190, it can be emitted via 195 and utilized to spray lawns, grass, and the like.

Figure 8:
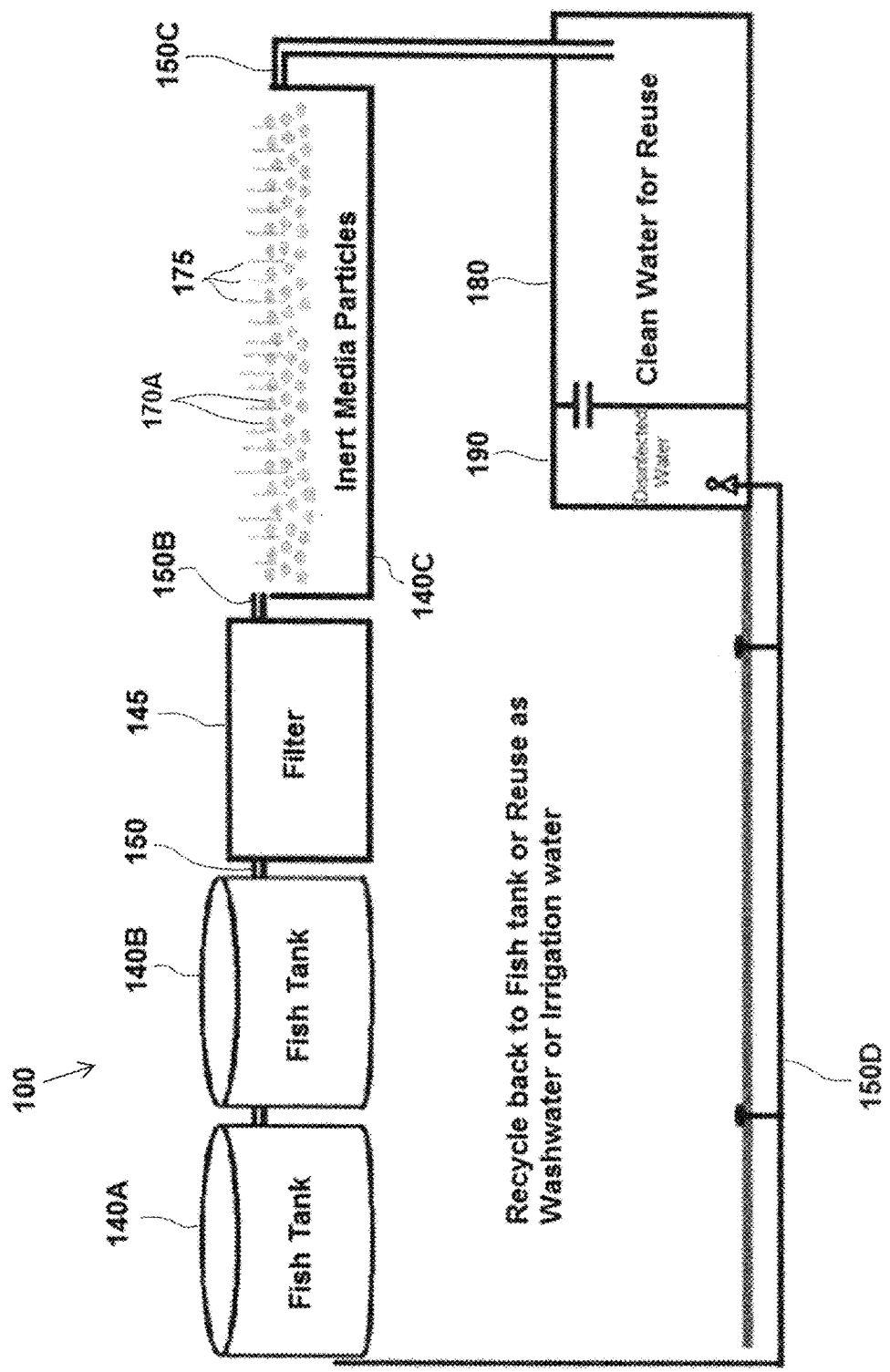
FIG. 8 is a schematic view wherein the waste water contains fish fecal matter that is treated by the floating inert media particles of the present invention.

FIG. 8 relates to fish farm 100 containing one or more fish tanks wherein a plurality of the same can be arranged separately, e.g. in parallel, or sequentially as shown. The fish within tank 140A and 140B are fed food and inherently defecate. The waste water of tanks 140A and 140B are fed via pipe 150A to filter tank 145 wherein fish food and other desirable matter are filtered out with the waste water containing fecal matter therein being fed via pipe 150B to waste collection tank 140C that contains inert media particles 170A therein. As above, preferably various one or more microorganisms are utilized to bioremediate the waste water as through various mechanisms such as eradication, reaction with the fecal matter, formation of new compounds, etc. Alternatively, they can contain plants 175 thereon whereby the roots thereof digest, consume, eat, etc., the fecal matter. Preferably, as shown in FIG. 8, both microorganisms and plants are utilized to treat the waste water and purify the same that is subsequently transferred via pipe 150C to treated water holding tank 180. The purified, cleaned water in tank 180 can be used for many uses such as for agricultural purposes, for industrial purposes, commercial purposes, and the like. Where disinfected water is desired, purified water from tank 180 can be fed to disinfectant tank 190 wherein it is purified as by any acceptable EPA or other government regulations such that it can be utilized as drinking water, for household uses such as cooking water, bathing, for toilets, and the like. In FIG. 8, the disinfected water or purified water in tank 180 can be utilized for irrigation, to water plants, for farm usage, and the like. Alternatively, disinfected water via pipe 150C can be recycled to fish tanks 140 to maintain a desirable water level therein. The fish within such tanks, of course, can be harvested and replaced by smaller fish wherein an aqueous farm growth cycle is repeated.

As apparent from the above, the above depicted end uses in FIGS. 4 through 8 can be utilized, along with numerous other end uses, all relating to the use of inert media particles preferably containing microorganisms therein, alternatively containing plant life thereon, or both, whereby the waste water is not only purified but also can be disinfected in accordance with EPA directives for drinking water, etc., or whereby purified non-disinfected water can be utilized for agriculture, aquatic, and other end uses. In other words, in addition to the above-noted aquatic animal farm applications, land animal applications, purification of one or more greases, fats, and oils, purification of various food processes such as the reduction of alcoholic beverages, and the like, hundreds of different aqueous purification systems exist Examples include private lakes, zoos, large lakes, ponds, retention ponds, rivers, streams, creeks, animal waste ponds, septic systems, grease traps, lift stations, wastewater treatment plants, Aerated Treatment Units (ATU's), as well as systems for villages, towns, cities, military installations, and the like.

Example

Figure 9:
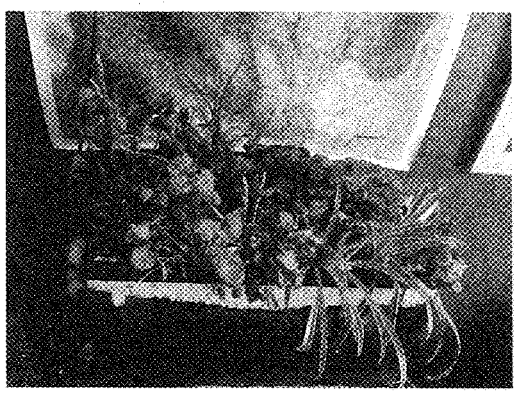
FIG. 9 are photographs of an actual example wherein fecal matter of fish in a fish tank was utilized to grow plant life on several layers of inert substrates of the present invention.
Figure 9:
Figure 9:
Figure 9:

For the duration of 4 months, according to the present invention, a 20 gallon fish tank was tested containing 5-10 gold fish in the water, floating bio media on the surface and multiple types of plants. The test was to confirm that the biological media was able to grow plants and grasses, by supporting their weight as they grew in the body of water, while at the same time microorganisms in the pore structure treated the ammonia, nitrogen, phosphorous etc. produced by the gold fish. After 4 months, no water was changed due to the buildup of waste in the water. Additionally, the plant life grew at a very rapid rate, and was harvested and consumed by personnel in the lab. The Ammonia was maintained at near zero levels throughout the test and the gold fish thrived in the clean water body. Accordingly, the viability and accuracy of the present invention disclosed herein was proved to be very accurate in producing plant life as well as consuming the fecal matter emitted by the goldfish. FIGS. 9A and D show the abundant plant life and was obtained by the same growing on a plurality of layers of inert media substrates as shown in FIGS. 9B and C.

The above invention generally relates to an aerobic bioremediation treatment system. However, it is to be understood that said treatment system can also be utilized with, or in conjunction with, an aerobic treatment systems, either naturally occurring or otherwise.

While in accordance with the patent statutes, the best mode and preferred embodiment have been set forth, the scope of the invention is not limited thereto, but rather by the scope of the attached claims.

What is claimed is:

1. An aqueous system, comprising:
a floating mass comprising a plurality of individual, inert media particles on an enclosed aqueous environment, said individual inert media particles being free of any foam boards, support, substrate, or other supporting device; said inert media particles, independently, having a surface area of from about 100 to about 100,000 square feet per cubic foot; said inert media particles having substantially open micropores therein and a pore diameter, independently, of from about 5 to about 2,000 microns; and said inert media particles being capable of growing plants thereon and having a specific gravity, independently, of less than 1.0.

2. The aqueous system of claim 1, wherein said enclosed aqueous environment comprises an enclosure, a pond, a lake, a slow moving stream or river, a container, or a tank, or any portion thereof, or any combination thereof; wherein said inert media particles have a porosity, independently, of from about 10% to about 50%, based on the total volume of said inert media particles; and wherein said specific gravity, independently, of said inert media particles is from about 0.4 to about 0.95.

3. The aqueous system of claim 2, wherein said inert media particles are in the form of a bed having one or more layers of said inert media particles in said enclosed aqueous environment; and said inert media particles have an average size, independently, of from about 0.0001 to about 0.5 cubic inches.

4. The aqueous system of claim 3, wherein said pore diameter, independently, is from about 10 to about 50 microns; wherein at least about 70% of said pores are open; and wherein the number of layers of said media bed is from 1 to about 50 layers thick; wherein the specific gravity of said inert media, independently, is from about 0.65 to about 0.95; wherein said inert media particles surface area, independently, is from about 4,000 to about 20,000 square feet per cubic foot; wherein said inert media particles have a porosity, independently, of from about 20% to about 40% based upon the total volume of said inert media particles; wherein said media particles have an average size, independently, of from about 0.007 to about 0.25 cubic inches; wherein said floatable inert media particles, independently, comprise, one or more of, a mineral substrate, a carbon substrate, a ceramic, a metal substrate, or a polymer, or any combination thereof; and including a nutrient comprising, independently, one or more of, nitrogen, nitrate, nitrite, phosphorous, potassium, copper, zinc, iron, boron, manganese, magnesium, or selenium.

5. The aqueous system of claim 4, wherein said system contains said plants, said plants comprising one or more different types of the following: vegetables, medical plants, herbs, foliage type plants, flowers, biocrops, aquatic plants, or environmental friendly plants, or different types of algae; aquatic fecal matter, or non-aquatic animal fecal matter, or both.

6. The aqueous system of claim 5, wherein said floatable mass of said inert media particles is confined by a barrier to one or more portions of said aqueous environment and forms an island, and including an aerator that is capable of supplying air and/or oxygen to said enclosed aqueous environment.

7. The aqueous system of claim 3, including at least one aquatic animal therein.

8. The aqueous system of claim 5, including at least one fish therein.

9. An aqueous, aerobic bioremediation system, comprising:
a floating mass comprising individual, inert media particles on an enclosed waste water environment, on an enclosed polluted water environment, or on an enclosed non-biological aqueous waste water environment, or any combination thereof; wherein said inert media particles, independently, have a porosity, of from about 10% to about 50% based upon the total volume of said inert media particles; wherein said inert media particles have micropores of a pore diameter, independently, of from about 5 to about 2,000 microns; said individual inert media particles being free of any foam boards, support, substrate, or other supporting device; wherein said inert media particle pores contain one or more bioremediation microorganisms; and wherein said inert media particles, independently, have a specific gravity of less than 1.0.

10. The aqueous, aerobic bioremediation system of claim 9, wherein said inert media particles, independently, have a surface area of from about 100 to about 100,000 sq. feet per cubic foot; wherein said inert media particles, independently, have a specific gravity of from about 0.4 to about 0.95; wherein said inert media particles have an average size, independently, of from about 0.0001 to about 0.5 cubic inches; wherein said inert media particles are in the form of a bed having one or more layers of said inert media particles in said enclosed aqueous environment; wherein said inert media particles, independently, comprise one or more of a mineral substrate, a carbon substrate, a ceramic, a metal substrate, or a polymer, or any combination thereof; wherein said bioremediation microorganisms comprise one or more of a bacteria, or a Protozoa, a spore, or a fungi; and wherein said aqueous environment comprises an enclosure, a pond, a lake, a slow moving stream or river, a container, or a tank, or any portion thereof, or any combination thereof.

11. The aqueous aerobic bioremediation system of claim 10, wherein the number of layers of said media bed is from about 2 to about 50 layers thick; wherein said media particles surface area, independently, is from about 4,000 to about 20,000 sq. feet per cubic foot; wherein the average particle size of said inert media particles, independently, is from about 0.007 to about 0.25 cubic inches; wherein said porosity of said inert media particles, is from about 20% to about 40% based upon the total volume of said inert media particles; and wherein said pore diameter of said inert media particles, independently, is from about 10 to about 50 microns.

12. The aqueous aerobic bioremediation system of claim 11, wherein said bacteria comprises one or more of *Pseudomonas vesicularis, Pseudomonas putida, Aeromonashydrophila, Brevibacteriumacetyficum; Nitrobacter* species comprising *Nitrobacterwinogradskyi, Nitrosomonas* species comprising *Nitrosomonaseuropaea*, and *Thiobacillus* species comprising *Thiobacillusdenitrificans*; and wherein Protozoa comprise one or more of sarcomastigophora, labyrinthomorpha, apicomplexa, microspora, acetospora, myxozoa, or ciliophoran; wherein said inert media particles comprise one or more polymers; and wherein said inert media particles have a substantial amount of open pores.

13. The aqueous, aerobic bioremediation system of claim 10, wherein said waste water comprises excrement, fecal matter, or sewage, or any combination thereof, derived from animals, or human beings, or any combination thereof; wherein said polluted water comprises environmentally contaminated water; wherein said non-biological compounds comprise chemicals, or corrosive compounds, or any combination thereof; and wherein said inert media particles comprise one or more of polyethylene, polypropylene, or polystyrene.

14. The aqueous, aerobic bioremediation system of claim 10, including an aerator that is capable of supplying air and/or oxygen through said aerobic bioremediation system; and wherein said floatable mass of said inert media particles is confined by a barrier to one or more portions of said aqueous environment and forms an island.

15. The aqueous, aerobic bioremediation system of claim 11, including plants, said plants comprising one or more of vegetables, medical plants, herbs, foliage type plants, flowers, biocrops, aquatic plants, environmentally friendly plants, or one or more types of algae, and one or more nutrients.

16. The aqueous, aerobic bioremediation system of claim 15, wherein said bacteria comprises one or more of *Pseudomonas vesicularis, Pseudomonas putida, Aeromonashydrophila, Brevibacteriumacetylicum; Nitrobacter* species comprising *Nitrobacterwinogradskyi, Nitrosomonas* species comprising *Nitrosomonaseuropaea*, and *Thiobacillus* species comprising *Thiobacillusdenitrificans*; and wherein Protozoa comprise one or more of sarcomastigophora, labyrinthomorpha, apicomplexa, microspora, acetospora, myxozoa, or ciliophoran.

17. The aqueous, aerobic bioremediation system of claim 16, wherein said system includes at least one type of an aquatic animal therein.

18. The aqueous, aerobic bioremediation system of claim 13, wherein said bacteria comprises one or more of *Pseudomonas vesicularis, Pseudomonas putida, Aeromonashydrophila, Brevibacteriumacetyficum, Nitrobacter* species comprising *Nitrobacterwinogradskyi, Nitrosomonas* species comprising *Nitrosomonaseuropaea*, and *Thiobacillus* species comprising *Thiobacillusdenitrificans*; and wherein Protozoa comprise one or more of sarcomastigophora, labyrinthomorpha, apicomplexa, microspora, acetospora, myxozoa, or ciliophoran.

19. The aqueous, aerobic bioremediation system of claim 13, including plants, said plants comprising one or more vegetables, medical plants, herbs, foliage type plants, flowers, biocrops, aquatic plants, or environmental friendly plants, or different types of algae.

20. The aqueous, aerobic bioremediation system of claim 19, wherein said bacteria comprises one or more of *Pseudomonas vesicularis, Pseudomonas putida, Aeromonashydrophila, Brevibacteriumacetyficum, Nitrobacter* species comprising *Nitrobacterwinogradskyi, Nitrosomonas* species comprising *Nitrosomonaseuropaea*, and *Thiobacillus* species comprising *Thiobacillusdenitrificans*; and wherein Protozoa comprise one or more of sarcomastigophora, labyrinthomorpha, apicomplexa, microspora, acetospora, myxozoa, or ciliophoran.

21. The aqueous, aerobic bioremediation system of claim 20, wherein said system comprises said waste water, and wherein said system comprises one or more nutrients.

22. The aqueous, aerobic bioremediation system of claim 21, including at least one aquatic animal therein.

23. The aqueous, aerobic bioremediation system of claim 15, wherein said enclosed waste water environment, or said enclosed polluted water environment, or said enclosed non-biological aqueous waste environment is transferred to one or more parallel or sequential collection tanks for further bioremediation thereof.

24. The aqueous, aerobic bioremediation system of claim 20, wherein said enclosed waste water environment, or said enclosed polluted water environment, or said enclosed non-biological aqueous waste environment is transferred to one or more parallel or sequential collection tanks for further bioremediation thereof.

25. The aqueous system of claim 19, wherein said pores are capable of containing or holding various nutrients, air, oxygen, growth regulators, disease resistant compounds, bacteria, carbon, aquatic fecal matter, or non-aquatic animal fecal matter, or both.

26. An aquaponic system, comprising:
 a floating mass comprising a mass of individual media particles on an enclosed aqueous environment; said inert media particles, independently, having a surface area of from about 100 to about 100,000 square feet per cubic foot; wherein said inert media particles have a porosity of from about 10% to about 50% based upon the total volume of said inert media particles; wherein said inert media particles have micropores of a pore diameter, independently, of from about 5 to about 50 microns; said inert media particles being capable of growing plants thereon and having a specific gravity, independently, of less than 1.0;
 said aqueous environment containing at least one nutrient; and
 said enclosed aqueous environment containing marine life and marine life fecal matter that is capable of being consumed by said plants.

* * * * *